(12) United States Patent
Tu et al.

(10) Patent No.: US 8,130,289 B2
(45) Date of Patent: Mar. 6, 2012

(54) SYSTEM, METHOD, AND APPARATUS FOR CORRECTION OF DARK CURRENT ERROR IN SEMICONDUCTOR IMAGING DEVICES

(75) Inventors: Nick Tu, Alhambra, CA (US); Nikolai E. Bock, Pasadena, CA (US)

(73) Assignee: Aptima Imaging Corporation, George Town (KY)

( * ) Notice: Subject to any disclaimer, the term of this patent is extended or adjusted under 35 U.S.C. 154(b) by 526 days.

(21) Appl. No.: 12/237,625

(22) Filed: Sep. 25, 2008

(65) Prior Publication Data

US 2010/0073524 A1 Mar. 25, 2010

(51) Int. Cl.
H04N 5/217 (2011.01)
H04N 9/64 (2006.01)
H04N 3/14 (2006.01)
H04N 5/335 (2011.01)

(52) U.S. Cl. ............... 348/243; 348/308; 348/241

(58) Field of Classification Search ............... 348/243, 348/241, 308, 302, 248, 340; 250/214.1; 257/291, 292, 239, 446, 223, 510; 438/429
See application file for complete search history.

(56) References Cited

U.S. PATENT DOCUMENTS

| 5,844,264 | A  | * | 12/1998 | Shinji           | 257/223   |
|-----------|----|---|---------|------------------|-----------|
| 6,518,607 | B2 | * | 2/2003  | Hynecek          | 257/239   |
| 6,721,005 | B1 | * | 4/2004  | Higuchi          | 348/243   |
| 7,064,406 | B2 | * | 6/2006  | Mouli            | 257/446   |
| 7,439,155 | B2 | * | 10/2008 | Mouli et al.     | 438/429   |
| 2001/0052574 | A1 | * | 12/2001 | Kurosawa et al. | 250/423 P |
| 2002/0051071 | A1 | * | 5/2002  | Itano et al.     | 348/340   |
| 2002/0149688 | A9 | * | 10/2002 | Matsunaga et al. | 348/308   |
| 2002/0186308 | A1 | * | 12/2002 | Baer             | 348/248   |
| 2003/0038336 | A1 | * | 2/2003  | Mann             | 257/510   |
| 2004/0090547 | A1 | * | 5/2004  | Takeda           | 348/241   |
| 2005/0087783 | A1 | * | 4/2005  | Jang             | 257/292   |
| 2005/0243193 | A1 |   | 11/2005 | Gove et al.      |           |
| 2005/0285954 | A1 | * | 12/2005 | Rossi et al.     | 348/243   |
| 2006/0192864 | A1 |   | 8/2006  | Mauritzson       |           |
| 2006/0227227 | A1 | * | 10/2006 | Tsuruoka         | 348/241   |
| 2007/0023614 | A1 | * | 2/2007  | Park et al.      | 250/214.1 |
| 2007/0045681 | A1 | * | 3/2007  | Mauritzson et al. | 257/292  |
| 2007/0046799 | A1 | * | 3/2007  | Moholt           | 348/302   |
| 2007/0096176 | A1 | * | 5/2007  | Mouli            | 257/291   |
| 2007/0120158 | A1 | * | 5/2007  | Rhodes           | 257/291   |
| 2007/0139539 | A1 | * | 6/2007  | Ohara et al.     | 348/243   |

OTHER PUBLICATIONS

U.S. Appl. No. 11/727,345, Jiang.

* cited by examiner

Primary Examiner — Jason Chan
Assistant Examiner — Stephen Coleman
(74) Attorney, Agent, or Firm — Nancy Y. Ru

(57) ABSTRACT

Detection cells configured to output signals for dark current error correction. Various embodiments of detection cells accumulate dark charge supplied by dark current sources, and output dark charge signals indicating the amount of accumulated dark charge. The dark charge signals may be used to approximate the amount of dark charge read out by pixel cells of an imaging array and/or to offset portions of pixel cell signals attributable to dark charge accumulation.

16 Claims, 11 Drawing Sheets

BACKGROUND

BACKGROUND

BACKGROUND

BACKGROUND

SYSTEM, METHOD, AND APPARATUS FOR CORRECTION OF DARK CURRENT ERROR IN SEMICONDUCTOR IMAGING DEVICES

TECHNICAL FIELD

The disclosed embodiments relate to semiconductor imaging devices, and more particularly relate to a system, method, and apparatus for correction of dark current error in semiconductor imaging devices.

BACKGROUND OF THE DISCLOSURE

"Dark current" refers to charge that alters a pixel signal and which is not generated by light detected by a photosensor. Such charge can aggregate with photocharge at the floating diffusion region of a pixel cell, and thereby increase the total charge sensed at the floating diffusion region and read out as a pixel signal. Dark current sources include, for example, substrate leakage and optical leakage. "Substrate leakage" refers to a leakage of charge from the substrate to the floating diffusion region. "Optical leakage" refers to a photogeneration of charge caused by light impinging on the floating diffusion region and from other sources.

A more specific example of potential sources of dark current is described with reference to FIGS. 1 and 2, which illustrate a conventional CMOS image pixel cell 150 and its operation. FIG. 1 is a circuit diagram of the image pixel cell 150, which accumulates photocharge in response to detected light and outputs signals representing the amount of accumulated photocharge. Prior to an integration period and in response to a first reset control signal RST1, an n-type accumulation region 101A of a photosensor 101, shown as a photodiode PD, is reset by a first reset transistor 105 having source/drain terminals respectively connected to a voltage supply PVDD1 and the accumulation region 101A. A p-type substrate layer 101B abuts the accumulation region 101A to form the photodiode photosensor 101. During the integration period, photocharge is generated by the photosensor 101 in response to impinging light and collected in the accumulation region 101A. In addition, substrate leakage, electrons entering the accumulation region 101A from the substrate, can contribute dark charge to each of the accumulation region 101A and floating diffusion region 102; and optical leakage, caused by stray light hitting the floating diffusion region, contributes dark charge to floating diffusion region 102. After the integration period and in response to a charge transfer signal TX, a transfer transistor 106 transfers the photocharge and dark charge within the accumulation region 101A to the floating diffusion region 102.

The transferred photocharge is stored at the floating diffusion region 102, which is connected to a gate of a source follower transistor 108 and has source/drain terminals connected to the voltage supply PVDD3 and source/drain of a row select transistor 109. The source follower transistor 108 generates an output signal VOUT representing the amount of charge stored at the floating diffusion region 102. Any dark charge contributed directly to the accumulation region 101A before the charge transfer operation is swept into the floating diffusion region 102 during charge transfer, where it aggregates with the dark charge contributed directly to the floating diffusion region 102. In the time period between the charge transfer and readout of the image signal VSIG, substrate and optical leakage can continue to contribute more dark charge to the floating diffusion region 102. In response to a row select signal ROW, the row select transistor 109 gates the output signal VOUT from the source follower transistor 108 to a column line 165 for subsequent signal processing. When representing the amount of photocharge at the floating diffusion region 102, the output signal VOUT is more particularly denoted as image signal VSIG.

In response to a second reset signal RST2, the floating diffusion region 102 is reset by a second reset transistor 107 having source/drain terminals connected to voltage supply PVDD2 and the floating diffusion region 102. The resulting amount of reset charge at the floating diffusion region 102 biases the gate of the source follower transistor 108, which consequently generates another output signal VOUT to the column line 165 (via row select transistor 109). Only an insignificant amount of dark charge, if any, is leaked into the floating diffusion region 102 during the reset operation.

When representing the amount of reset charge at the floating diffusion region 102, the output signal VOUT is more particularly denoted as reset signal VRST. Although the same reset voltage is applied to a plurality of similarly constructed image pixel cells 150 within an imaging device, the individual image pixel cells 150 may generate different reset signals VRST because of device imperfections causing different degrees of signal error. Since the imperfections cause substantially equal errors in the image and reset signals VSIG, VRST of a given image pixel cell 150 and in order to reduce other common node noise, a differential signal VRST−VSIG is produced for each image pixel cell 150 to offset such errors. The differential signals VRST−VSIG of the individual image pixel cells 150 are digitized and collectively used to form an image.

FIG. 2 contains potential diagrams illustrating contributions of photocharge PC and dark charge DC to a readout signal VSIG of the image pixel cell 150 of FIG. 1. The contributions of photocharge PC and dark charge at the photodiode DC(PD) and at the floating diffusion region DC(FD) are shown by arrows pointing to the illustrated wells of the accumulation region 101A and floating diffusion region 102. The reference characters "DC(PD)" and "DC(FD)" refer more particularly to respective dark charge contributed to the accumulation region 101A (which is part of the photodiode photosensor 101) and to the floating diffusion region 102. Switching on and off of the reset and transfer transistors 105-107, during operation of the image pixel cell 150, is shown by the rise and fall of their respective potential bands due to control signals RST1, RST2, TX.

In operational step 201, the accumulation region 101A and floating diffusion region 102 are reset by switching on the first and second reset transistors 105, 107, respectively. As a result, charges held in region 101A and floating diffusion region 102 are depleted. In step S202, during the integration period, photocharge PC and dark charge DC(PD) are accumulated by the accumulation region 101A of the photodiode PD. In addition, dark charge DC(FD) is accumulated by the floating diffusion region 102. In step S203, when the transfer transistor 106 is switched on, both photocharge PC and dark charge DC(PD) are swept from the photodiode PD into the floating diffusion region 102. In step S204, the photocharge PC and dark charge DC(PD)+DC(FD) within the floating diffusion region 102 is sensed by the source follower transistor 108 and read out as an image signal VSIG. In step S205, the floating diffusion region 102 is reset by switching on the second reset transistor 107. In step S206, the reset charge is sensed and read out as the reset signal VRST.

The image signal VSIG of the image pixel cell 150 does not indicate the amount of photocharge PC in the floating diffusion region 102, but rather indicates both the collective amount of photocharge PC and dark charge DC(PD), DC(FD) stored in the floating diffusion region 102. Thus, because the image signal VSIG has a photocharge component VSIG(PC) (i.e., resulting from photocharge) and a dark charge component VSIG(DC) (i.e., resulting from dark charge), a pixel value produced from a differential signal VRST−VSIG of the image pixel cell 150 will not accurately reflect the amount of light detected by the photosensor 101. The dark charge component VSIG(DC) represents the "dark current error" in the image signal VSIG. Because an insignificant amount of dark charge is accumulated in the floating diffusion region 102 during the reset operation, the dark charge component VSIG (DC) of the image signal VSIG represents the "dark current error" in the differential signal VRST−VSIG.

FIGS. 3A and 3B are diagrams illustrating one example of the result of dark current error. More particularly, FIG. 3A illustrates a pixel cell array 30 having a plurality of image pixel cells 150 arranged in rows 33R and columns 33C. FIG. 3B illustrates an image I of a monotone object (e.g., a flat gray screen) captured by the array 30. Each pixel P of the image I is produced from a differential signal VRST−VSIG of a respectively positioned image pixel cell 150, e.g., a pixel $P_{x,y}$ is produced from the differential signal VRST−VSIG of an image pixel cell $150_{x,y}$ (where x and y respectively denote a column 33C and row 33R) during pixel array readout following a global shutter operation. The brightness of each pixel P is indicated by its respective amount of stippling (dots), such that brighter pixels P have more stippling than darker pixels P. In a global shutter operation, all photosensors integrate over the same time period and then transfer their charges at the same time to an associated floating diffusion region. Readout, however, occurs row-by-row.

As shown by the progressive increase in stippling of the pixels P, along direction A, the image I as read out row-by-row does not correctly show the object as being monotone. Rather, the image I shows the object as increasing in brightness along direction A. This "vertical shading" caused by the global shutter operation in which all image pixel cells 150 synchronously perform steps S201-S203, but the output signals VOUT (VSIG, VRST) of the image pixels cells 150 are read out on a row-by-row basis from top-to-bottom of the array 30, i.e., read out along direction A. Thus, the amount of idle time between global charge transfer and signal readout is different for each row 33R of image pixel cells 150 (e.g., the length of duration between steps of S203 and S204 is different for each row 33R), such that dark charge accumulates in the later-read image pixel cells 150 (i.e., image pixel cells 150 in the lower portion of the array 30) for a longer time period than it collects in the earlier-read image pixel cells 150 (i.e., upper image pixel cells 150). This discrepancy causes a progressive increase in the amount of dark charge accumulated by the pixel cells 150 along direction A, and a corresponding increase in the brightness of the image I along direction A, as well.

A system, method, and apparatus that mitigates dark current error is desired.

DETAILED DESCRIPTION OF THE DRAWINGS

The accompanying drawings illustrate specific embodiments of the invention which are provided to enable those of ordinary skill in the art to make and use them. It should be understood that the embodiments are not limited to their illustrations and written descriptions or limited to the examples of dark current error disclosed herein. Structural, logical or procedural changes may be made.

Figure 3B:
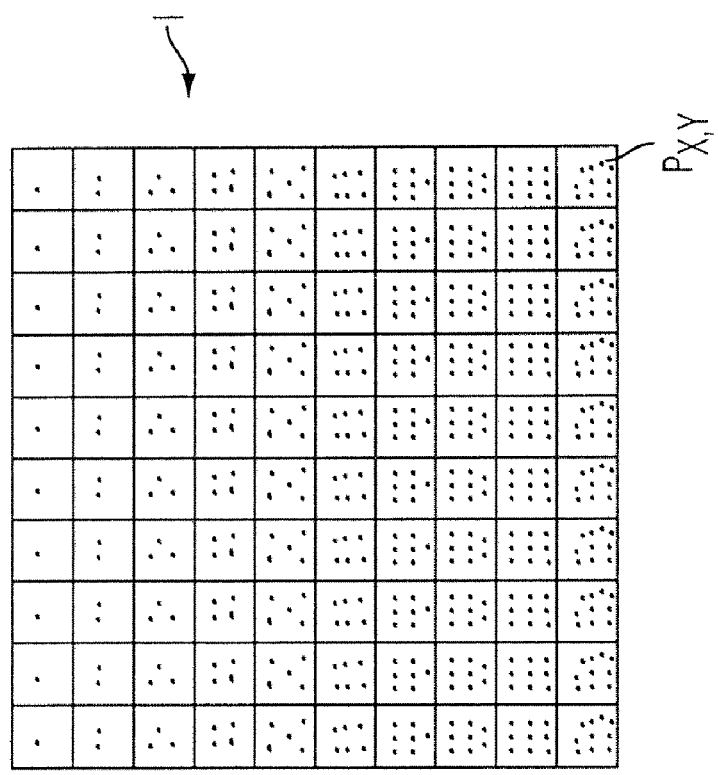
FIG. 3B is a diagram illustrating a non-limiting example of an image which may be produced from the output signals of the pixel cell array of FIG. 3A.
Figure 3A:
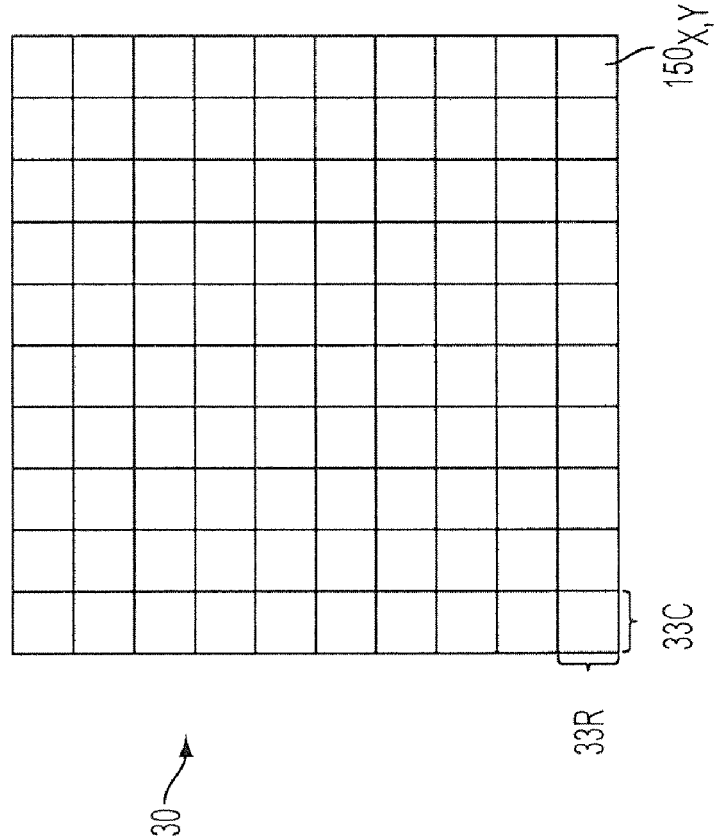
FIG. 3A is a diagram illustrating a non-limiting example of a pixel cell array which may employ the image pixel cell of FIG. 1.
Figure 4A:
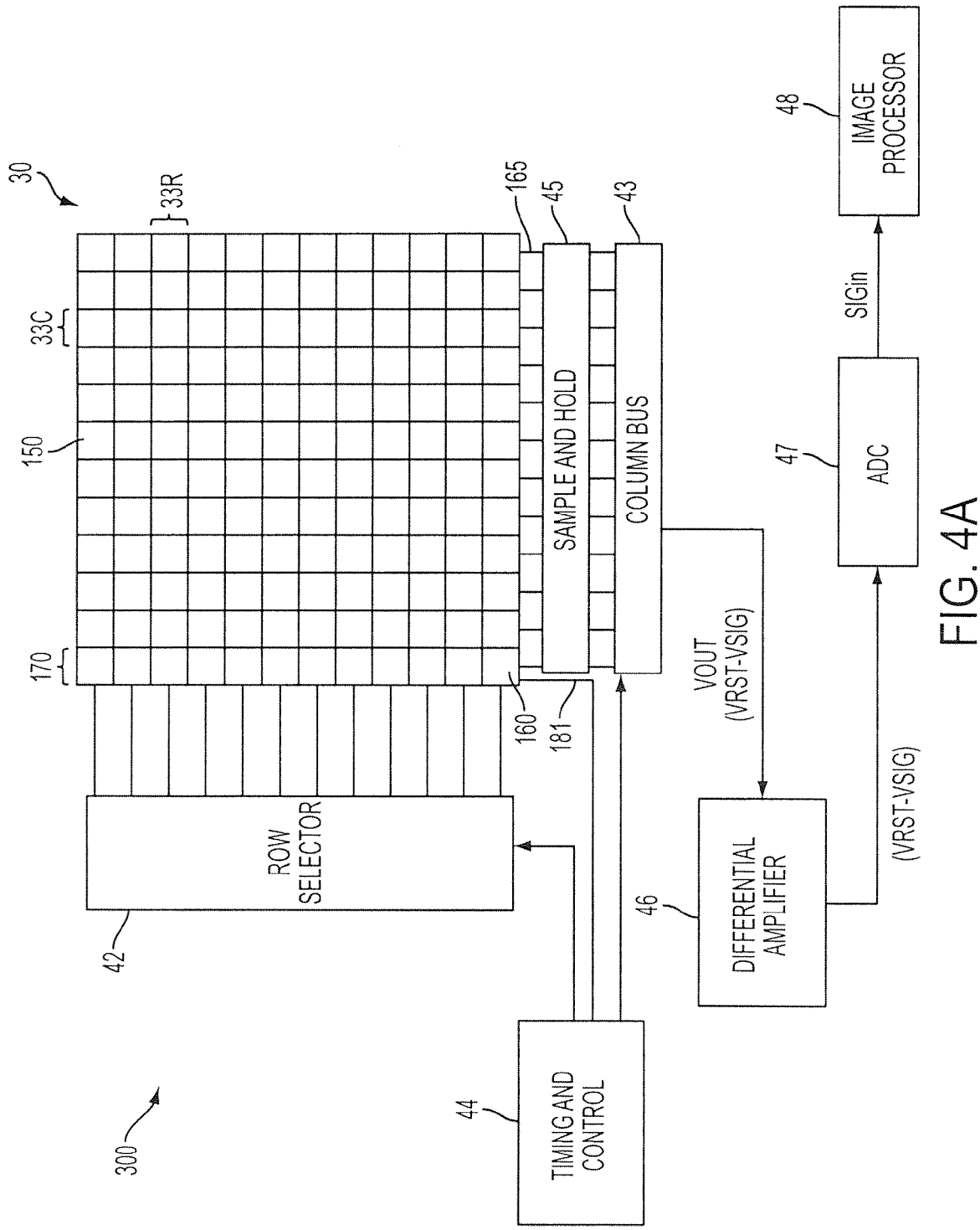
FIG. 4A is a block diagram illustrating a non-limiting example of an imaging device performing a dark current error correction.

FIG. 4A is a block diagram illustrating a CMOS (complementary metal oxide semiconductor) imaging device 300 with dark current error correction in accordance with an embodiment disclosed herein. As shown, the imaging device 300 includes the pixel cell array 30 of FIG. 3, which has rows 30R and columns 30C of pixel cells 150. The pixel array 30 is connected to a row selector 42. Under the direction of the timing and control circuit 44, the row selector 42 causes each pixel cell 150 of a selected row 33R to transmit at least one output signal VOUT, via its respective column line 165, to a sample-and-hold circuit 45. A column bus 43 then selectively passes the output signals VOUT from the sample-and-hold circuit 45 to a system of components for generating pixel data.

In this example, each pixel cell 150 transmits two output signals VOUT, a reset signal VRST and the image signal VSIG, to the sample and hold circuit 45. The reset signal VRST and image signal VSIG of each pixel cell 150 within the selected row 30R are stored by respective capacitors in the sample and hold circuit 45. After the sample and hold circuit 45 stores the reset signal VRST and image VSIG signal for a respective pixel cell 150, those signals VRST, VSIG are passed by the column bus to a differential amplifier 46, which converts the output signals VOUT to a differential signal (VRST−VSIG). The differential signal (VRST−VSIG) is digitized by an analog-to-digital converter (ADC) 47, and the digital pixel data is input as an input signal SIGin to an image processing chain contained within an image processor 48.

In addition to pixel cells 150, the imaging device 300 of FIG. 4A also includes a column 170 of detection cells 160, each producing a dark charge signal VDC that indicates the respective dark charge components VSIG(DC) of the image signals VSIG read out by respective image pixel cells 150 of the same row 33R. For example, if the image signal VSIG of a image pixel cell 150 equals the sum of its photocharge and dark charge components VSIG(PC), VSIG(DC), then a respective dark charge signal VDC of a detection cell 160 in the same row 33R approximates only the dark charge component VSIG(DC) of the image signal, i.e., VDC≈VSIG(DC). The dark charge signals VDC may be generated in a variety ways. One approach is forming an array of detection cells and image pixel cells with substantially identical configurations, but preventing incoming light from reaching the detection cells, e.g., by using a light shield. Such an approach is disclosed by U.S. Publication No. 2006/0192864, U.S. Publication No. 2005/0243193, and U.S. application Ser. No. 11/727, 345, each of which is assigned to Micron Technology, Inc. and herein incorporated by reference in its entirety. As disclosed therein, detection cells and image pixel cells may be configured to accumulate dark charge at roughly the same rate and for the same duration. But since the detection cells do not generate photocharge, each detection cell generates a dark charge signal VDC (in lieu of an image signal VSIG), which approximates the dark charge component VSIG(DC) of image signals VSIG read out by image pixel cells in the row.

The dark charge signals VDC may be generated in a variety ways. One approach is forming an array of detection cells and image pixel cells with substantially identical configurations, but using a light shield to prevent incoming light from reaching the detection cells. The detection cells and image pixel cells may be thereby configured to accumulate dark charge at roughly the same rate and for the same duration. However, since the detection cells do not generate photocharge, each detection cell generates a dark charge signal VDC (in lieu of an image signal VSIG) approximating the dark charge component VSIG(DC) of the image signals VSIG read out by image pixel cells in the row. The detection cells 160 and image pixel cells 150 in the embodiment described herein also collect equal amounts of dark charge by collecting dark charge at roughly the same rate and for the same duration. In lieu of using optical shields, but the detection cells 160 are merely operated in a manner that prevents them from collecting photocharge within their floating diffusion regions 102. More particularly, the readout transistors 105-109 of the detection cells 160 and image pixel cells 150 within the same row 33R are operated differently. Thus, the detection cells 160 and image pixel cells 150 can have identical configurations, but still respectively produce dark charge signals VDC and image signals VSIG because the image pixel cells 150 and detection cells 160 have respective operations.

Both the detection cell 160 and image pixel cells 150 of a given row 33R of the array 30 are controlled by the collective action of the timing control circuit 44 and row selector 42. In the array 30, for a given row 33R including a detection cell 160 and image pixel cells 150, the gates of the first reset transistors 105, charge transfer transistors 106, second reset transistors 107, and the gates of the row select transistors 109 are commonly connected by four respective common control lines selectively driven by the row selector 42. The timing control circuit 44 operates the array 30 by, in part, instructing the row selector 42 as to when and which common control lines are driven high (or low) to activate the connected transistors. For example, after a global integration period, the common control lines for the charge transfer transistors 106 of each row 33R may be simultaneously driven high to activate all of the charge transfer transistors 106 of the image pixel cells 150. However, in order to differently operate the detection cells 160 and image pixel cells 150, the timing and control circuit 44 may output signals, via line 180 of FIG. 4A, to partially override control of the detection cells 160 by the row selector 42.

Figure 4B:
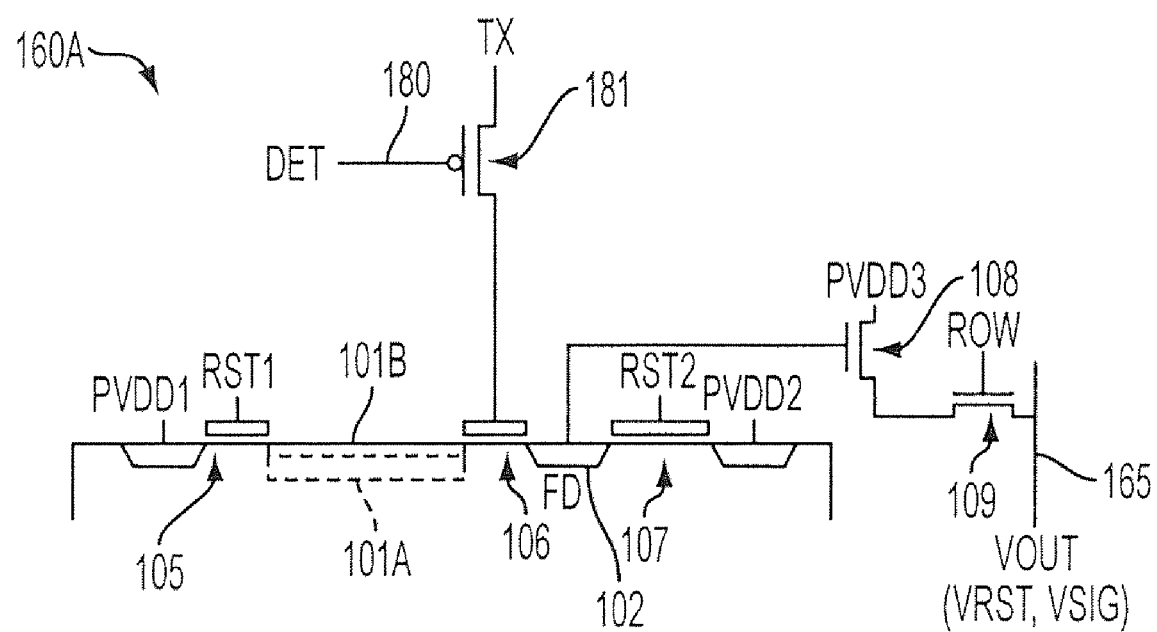
FIG. 4B is a circuit diagram illustrating a non-limiting example of a pixel cell which may be used in dark current detection operation.

For example, each detection cell 160 may include a transistor which, when receiving a high signal from the timing control circuit, via line 180, selectively disconnects the gate of the charge transfer transistor 106 from its respective common control line to prevent its activation and charge transfer (see steps S601-606 of FIG. 5A; described below). FIG. 4B illustrates a detection cell 160A having such a configuration. As shown, a p-type transistor 181 includes a gate connected to line 180, a terminal receiving the charge transfer signal TX, and another terminal connected to the gate of the charge transfer transistor 106 (which, in this example, is assumed to be an n-type transistor activated by the gate's receipt of a high signal and deactivated by the gate's receipt of a low signal). When the gate of the transistor 181 receives a high detection control signal DET from line 180, the transistor 181 prevents the charge transfer signal TX from activating the charge transfer transistor 106 and, in turn, prevents charge transfer from the accumulation region 101A to the floating diffusion region.

Figure 4C:
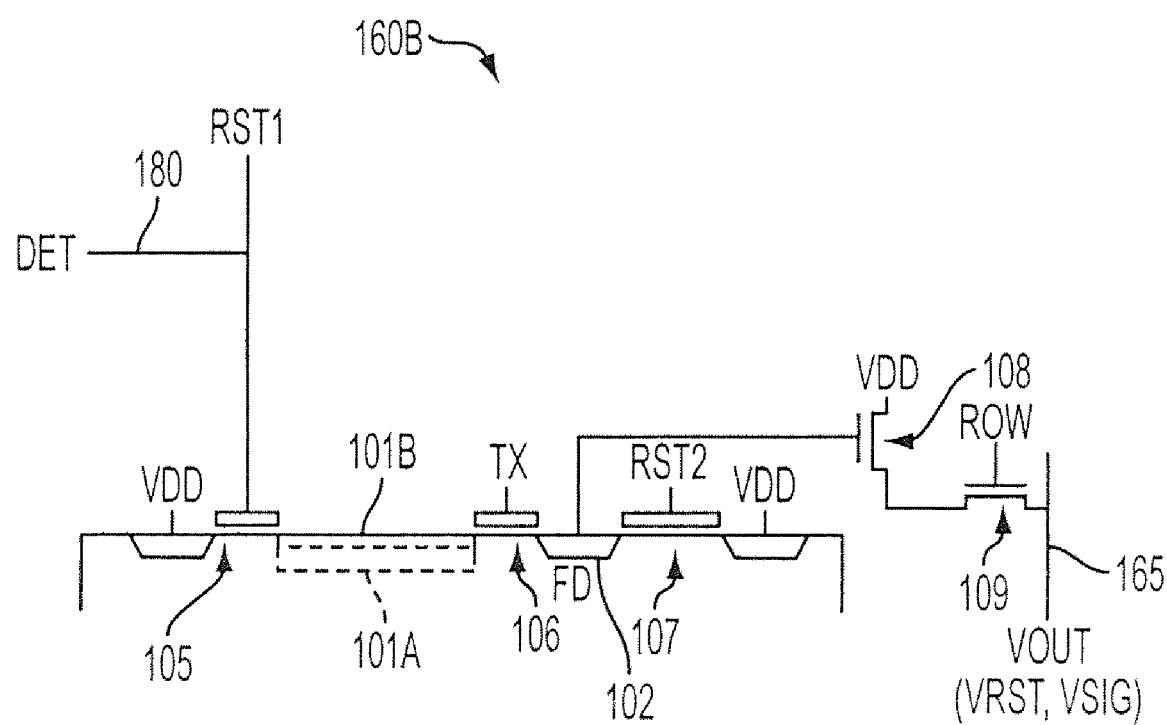
FIG. 4C is a circuit diagram illustrating a non-limiting example of a pixel cell which may be used in a dark current detection operation.

As another example, line 180 may be connected directly to the gate of the first reset transistor 105 of each detection cell 160, such that the same high signal from the timing control circuit, received via line 180, holds the first reset transistor 105 in the active state (see steps S601-606 of FIG. 5A; described below) regardless of the whether the first reset control signal RST1 is a high signal or low signal. FIG. 4C illustrates a detection cell 160B having such a configuration. As shown, line 180 is connected directly to the gate of the first reset transistor 105 (which, in this example, is assumed to be an n-type transistor activated by the gate's receipt of a high signal and deactivated by the gate's receipt of a low signal). Thus, both a detection control signal DET from line 180 and a first reset control signal RST1 are received by the gate of the first reset transistor 105 in the detection cell 160B. If either is a high signal, the first reset transistor 105 of the detection cell 160B is activated to prevent charge integration.

Figure 1:
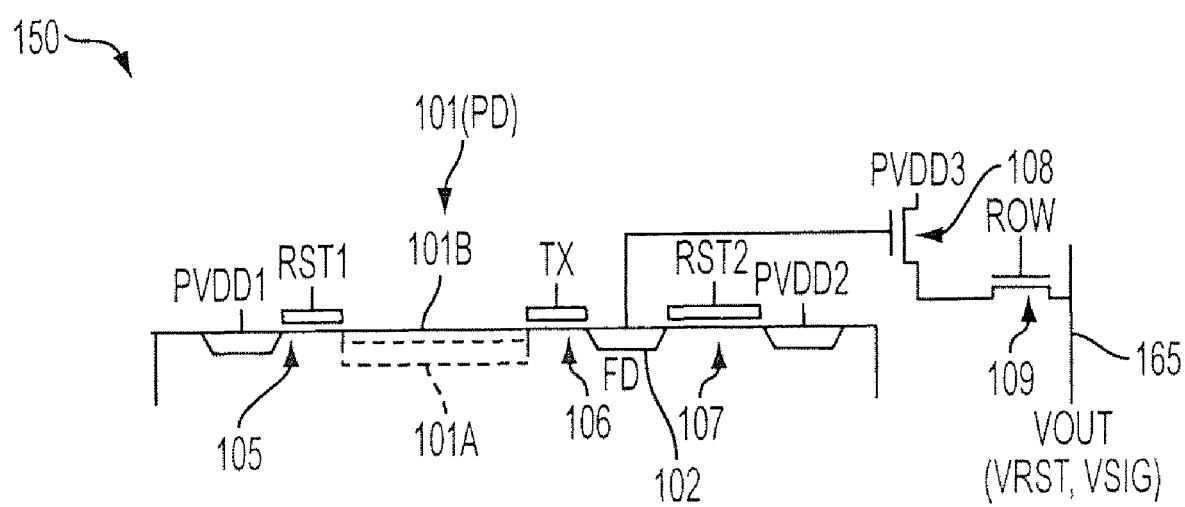
FIG. 1 is a circuit diagram illustrating a non-limiting example of a conventional image pixel cell.
Figure 2:
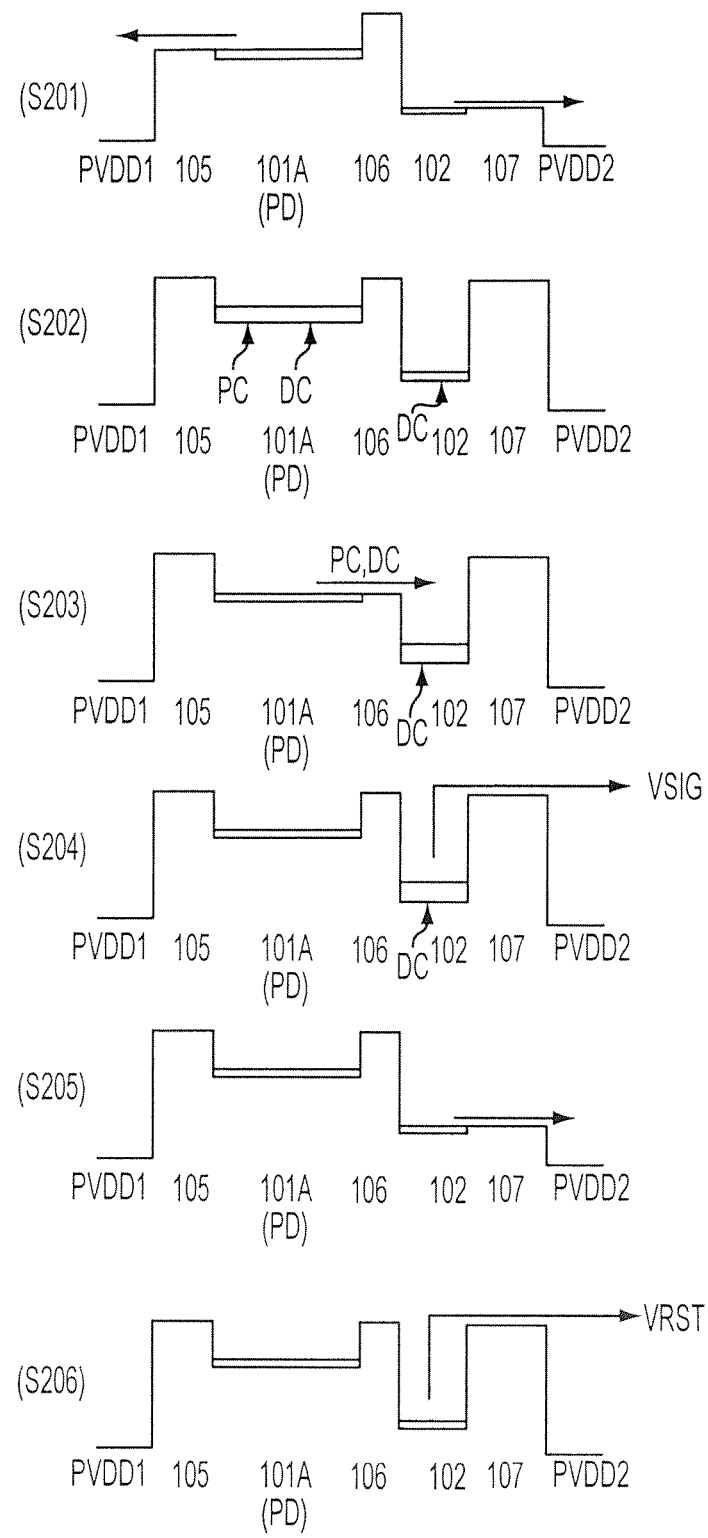
FIG. 2 includes potential diagrams illustrating a non-limiting example of an operation which may be performed by the image pixel cell of FIG. 1.
Figure 5A:
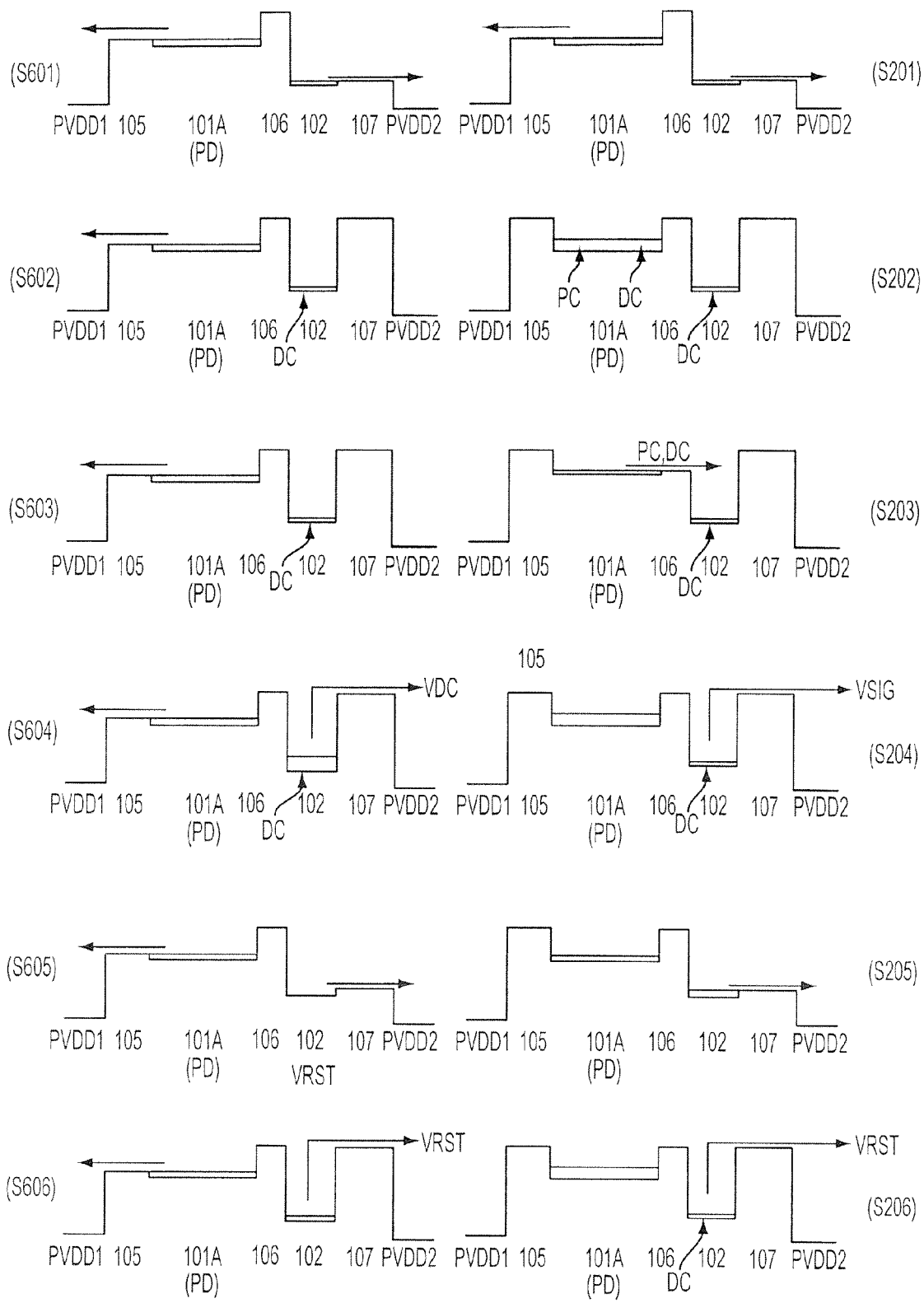
FIG. 5A includes potential diagrams illustrating a non-limiting example of an operation which may be performed by the imaging device of FIG. 4A.

FIG. 5A includes charge level diagrams illustrating a global shutter operation for a detection cell 160 and image pixel cell 150 of a given row 33R within the array 30 of the imaging device 300 (FIG. 4A). The detection cell 160 is operated in accordance with steps S601-S606. The image pixel cell 150 is operated in accordance with steps S201-S206, which are identical to the like-referenced steps of FIG. 2. Steps S601-S606 of the detection cell 160 and steps S201-S206 of the image pixel cell 150 are performed in unison, respectively. Thus, the accumulation regions 101A and floating diffusion regions 102 of both the detection cell 160 and image pixel cell 150 are reset in steps S201 and S601, respectively. While the image pixel cell 150 (and all other image pixel cells 150 of the array 30) undergoes photocharge integration and transfer in steps S202 and S203, the first reset and transfer transistors 105, 106 of the detection cell 160 are respectively held on and off in steps S602 and S603 to prevent collection of photocharge in the photosensor 101 of the detection cell 160. In the detection cell 160, the dark charge signal VDC is read out of the floating diffusion region 102 at step S604, the floating diffusion region 102 is reset at step S605, and the reset signal VRST is read out at step S606. In the image pixel cell 150, the image signal VSIG is read out at step S204, the floating diffusion region 102 is reset at step S205, and the reset signal VRST is read out at step S206.

As indicated by steps S202-S204 of FIG. 5A, the magnitude of the image signal VSIG of the image pixel cell 150 increases due to both dark charge DC(PD) leaked directly to its accumulation region 101A (before charge transfer) and dark charge DC(FD) leaked directly to its floating diffusion region 102. On the other hand, as indicated by steps S602-S604 of FIG. 5A, the magnitude of the dark charge signal VDC of the detection cell 160 increases due to only dark charge DC(FD) leaked directly to its floating diffusion region 102. Thus, the dark signal VDC does not indicate the full amount of dark current error in the image signal VSIG, but rather only indicates the dark current error caused by dark charge DC(FD) leaked directly to the floating diffusion region 102 of the image pixel cell 150.

However, because the period of time between reset (e.g., step S201) and charge transfer (e.g., step S203) is the same for all image pixel cells 150 within the array 30, the amount of dark charge DC(PD) leaked directly to the accumulation regions 101A of the image pixel cells 150 is substantially equal for all image pixel cells 150. These equal amounts of dark charge DC(PD) contribute equal amounts of dark current error to the image signals VSIG of all image pixel cells 150, and therefore cause the same amount of shading in each line of a resulting image. Such uniform shading is tolerable because it is more difficult to perceive than the vertical shading caused by disparate amounts of dark charge DC(FD) present at the floating diffusion regions 102 of the image pixel cells 150.

The detection cells 160 of this embodiment have several advantages over detection cells that are shielded from receiving light. Like the image pixel cells 150, the detection cells 160 are not optically shielded. Therefore, like the floating diffusion regions 102 of the image pixel cells 150, the floating diffusion regions 102 of the detection cells 160 also accumulate dark charge caused by optical leakage (i.e., caused by light impinging on the floating diffusion regions 102). Further, like the image pixel cells 150, the substrates of the detection cells 160 are also heated by the impinging light, which can cause corresponding and substantial increases in substrate leakage. Each of these dark current sources contribute to vertical shading which, as noted, is more easily perceived than uniform increases in brightness throughout the array 30. Thus, because the detection cells 160 are not optically shielded, they are more accurate in detecting the amount of dark charge accumulated by the image pixel cells 150 and allow for better correction of vertical shading.

In addition, because the detection cells 160 and image pixel cells 150 have identical configurations, but are merely operated differently, dark current detection can be selectively and easily implemented, e.g., by mere changes in software or firmware for operating the image pixel cells 150. Consequently, during capture of a first image, a first set of pixel cells and a second set of pixel cells can be differently operated such that the output of the each pixel cell of the first set produces a dark charge signal indicating a dark current error in an image signal of one or more pixel cells in the second set. During capture of a second image, however, the first set and second set of pixel cells can be operated in the same manner such each pixel cell of the first set and second set outputs an image signal indicating an amount of detected light for a corresponding position of the second image. As any image pixel cell 150 can be designated a detection cell 160, the detection cell 160 positions need not be limited to preset positions, e.g., need not be limited to columns 33C at the edges of the array 30. Rather, for example, the detection cells 160 can be uniformly or randomly spread throughout the array 30 (e.g., shotgun-style). In such a case, pixel values can be interpolated for the detection cells 160 by means known in the art.

Figure 5B:
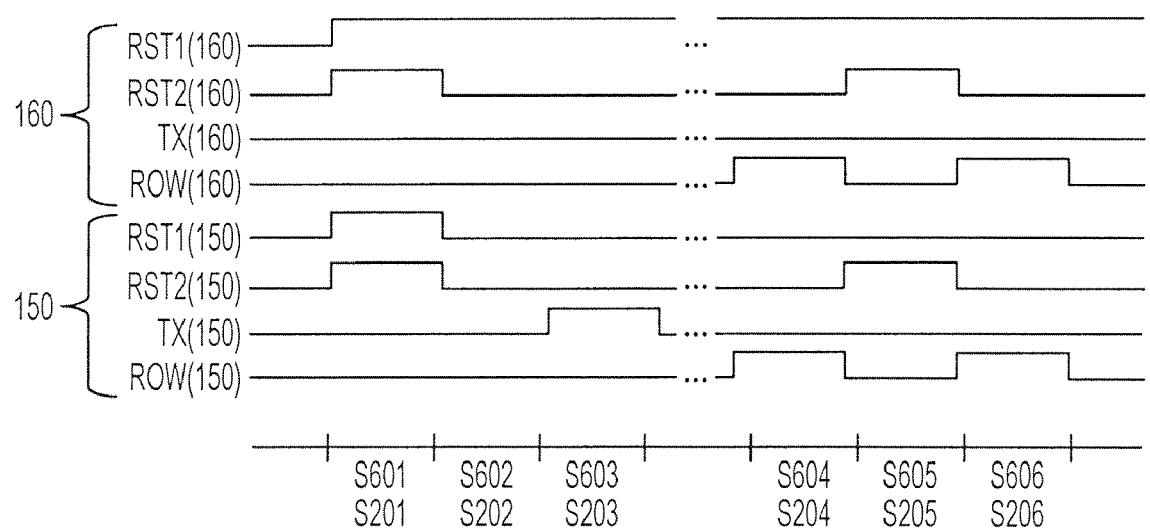
FIG. 5B is a timing diagram illustrating a non-limiting example of the operation of FIG. 5A.

FIG. 5B is a timing diagram illustrating a non-limiting example of the operation illustrated by FIG. 5A. As noted above and shown, steps S601-S606 of the detection cell 160 and steps S201-S206 of the image pixel cell 150 are performed in unison. The timing of the steps S601-606 and S201-206 is shown at the bottom of the diagram. First, the accumulation regions 101A and floating diffusion regions 102 of both the detection cell 160 and image pixel cell 150 are reset by simultaneously applying high first RST1(160), RST1 (150) and second RST2(160), RST2(150) reset signals to each of the detection cell 160 and pixel cell 150, which as noted are part of the same row 33R of the pixel array 30. During the global integration period in which all pixel cells 150 of the pixel array 30 integrate charge in response to light impinging on their photosensors 101 (corresponding to steps S602 and S202), only the first reset transistor 105 of the detection cell is held in its activated state to prevent an accumulation of photocharge by the photosensor 101 of the detection cell 160.

At the end of the integration period, the charge transfer transistor 106 of the pixel cell 150 is switched on, by application of a high charge transfer signal TX(150) to its gate, to transfer photogenerated charge from the accumulation region 101A of the pixel cell 150 to its floating diffusion region 102 as part of the global shutter operation (at which time all pixel cells 150 of the pixel array 30 simultaneously transfer charge to the end the integration period). Because no photocharge will be transferred from the accumulation region 101A of the detection cell 160 to its floating diffusion region 102, the transistors 105-109 of the detection cell 160 remain in the same state. For example, there is no activation of the charge transfer transistor 106 of the detection cell 160 and, consequently, no pulsing of a charge transfer signal TX(160) to activate the charge transfer transistor 106 of the detection cell 160.

The ellipses within each of the signals indicate a delay between the above-noted charge transfer (which corresponds to the end of the global integration period) and readout of the detection cell 160 and pixel cell 150. In the case of vertical shading, this delay is shorter for the earlier-read pixel cell rows 33R (e.g., the upper rows 33R) than the later-read pixel cell rows 33R. After this delay, high row select signals ROW (160), ROW(150) are simultaneously applied to respective row select transistors 109 of both the detection cell 160 and pixel cell 150 to release a dark charge signal VDC of the detection cell 160 and an image signal VSIG of the pixel cell 150. The second reset transistors 107 and then the row select transistors 109 of the detection cell 160 and pixel cell 150 are activated by application of respective second reset signals RST2(160), RST2(150) and row select signals ROW(160), ROW(150) to output reset signals VRST for each of the detection cell 160 and pixel cell 150. As noted with reference to FIGS. 4B and 4C and shown in the timing diagram of FIG. 5B, the detection cell 160 may be connected to the same transistor control lines as the pixel cell 150 (which is in the same row 33R), but may nonetheless be prevented from deactivating its first reset transistor 105 and activating its charge transfer transistor 106 by application of a detection control signal DET to the detection cell 160.

Referring back to FIG. 4A, the output signals VOUT of the detection cell 160 (VDC, VRST) and its respective image pixel cells 150 (VSIG, VRST) of the same row 33R may be read out to the column bus 43, converted to differential signals VRST−VDC, VRST−VSIG, digitized by the ADC 47, and passed to the image processor 48 for digital processing. Corrected image signal values VSIG(PC) (digital values, as opposed to signals, are indicated by italics) may be generated in the image processor 48 by subtracting the differential signal value VRST−VSIG=VRST−[VSIG(PC)+VSIG(DC)] of each image pixel cell 150 from the differential signal value VRST−VDC≈VRST−VSIG(DC) of the respective detection cell 160. The reset signal values VRST of the differential signal values VRST−VSIG and VRST−VDC are substantially equal because the same reset voltage is applied to the floating diffusion regions 102 of the image pixel cells 150 and detection cells 160, and because the different errors in the reset signal components VRST (e.g., caused by device imperfections) are offset by corresponding errors in the image and dark charge signals VSIG, VDC of the differential signals VRST−VSIG, VRST−VDC.

Figure 5C:
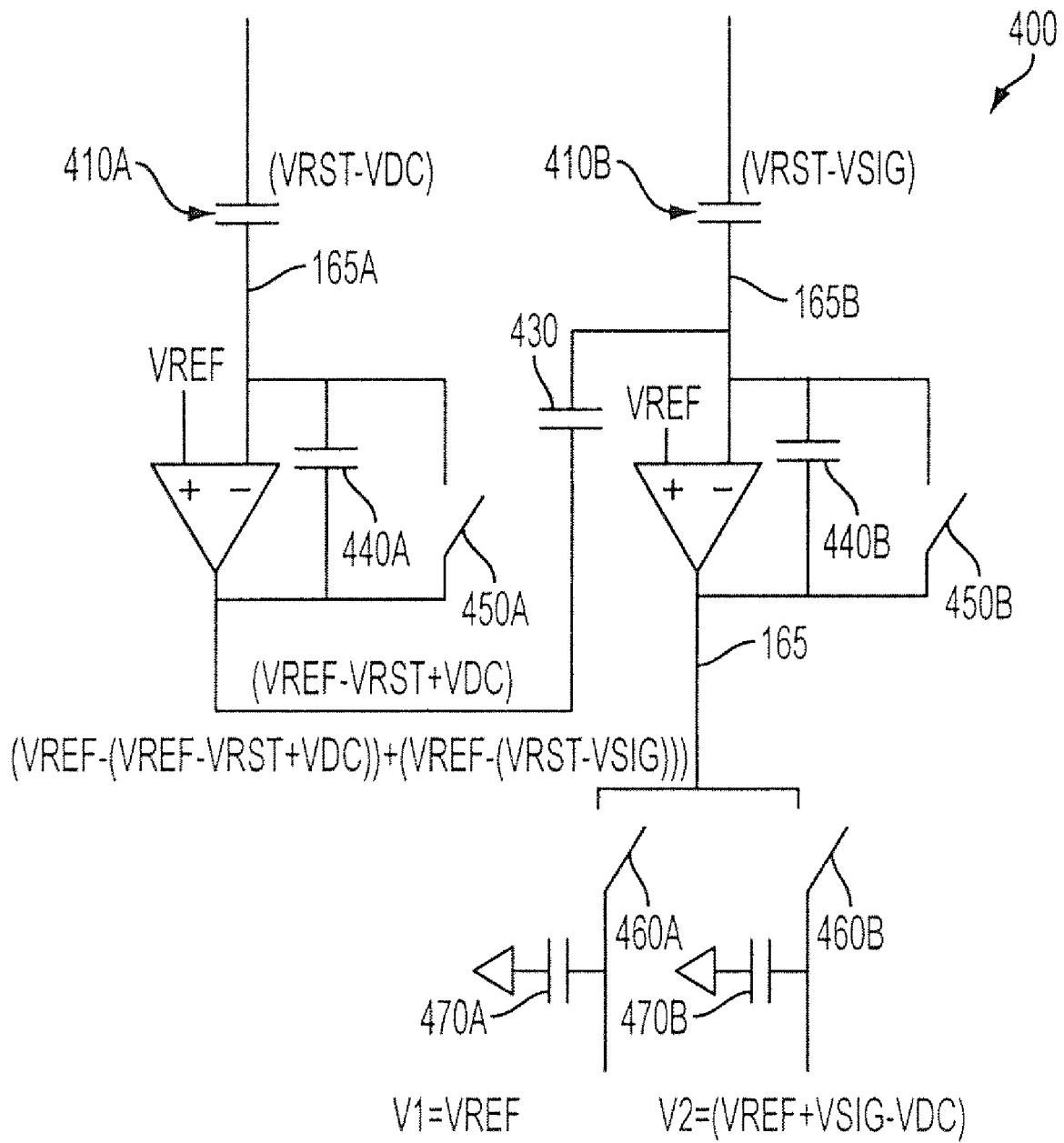
FIG. 5C is a circuit diagram illustrating a non-limiting example of a portion of a circuit for generating an image signal adjusted for dark current correction.

As an alternative to digital processing, corrected image signals VSIG(PC) may also be generated in the analog domain by subtracting the differential signal VRST−VSIG=VRST−[VSIG(PC)+VSIG(DC)] of each image pixel cell 150 from the differential signal VRST−VDC≈VRST−VSIG(DC) of the respective detection cell 160. FIG. 5C is a circuit diagram of a circuit portion 400 for generating the corrected image signals VSIG(PC) in the analog domain. The components may be arranged as part of the pixel cell array 30 and sample and hold circuit 45 of the imaging device 300 of FIG. 4A. Each column line 165A, 165B has a respective capacitor for storing pixel signals of a detection cell 160 (VRST, VDC) or an image pixel cell 150 (VRST, VSIG) within a selected row 30R. In this example, only two such column line capacitors 410A, 410B are shown. The selected detection cell 160 and selected image pixel cell 150 may correspond to the detection cell 160 and image pixel cell 150 associated with the diagrams of FIGS. 5A and 5B.

Each of the feedback control switches 450A, 450B and the sample control switches 460A, 460B is controlled by the timing and control circuit 44 of the imaging device 300. During a first phase of readout, each of the feedback control switches 450A, 450B is closed (conducting) and the sample control switches 460A and 460B are closed and open, respectively. Thus, the feedback capacitors 440A, 440B are shorted and their respective amplifiers 420A, 420B each output a reference voltage VREF. Since the sample control switches 460A and 460B are respectively closed and open, the reference signal VREF is stored as a first voltage V1 to the first phase capacitor 470A of the column line 165B.

Also during a first phase of readout, the selected detection cell 160 outputs and stores its dark charge signal VDC (see step S604) to the column line capacitor 410A; and, simultaneously, the selected pixel cell 150 outputs and stores its image signal VSIG (see step S204) to the column line capacitor 410B.

During the second phase of readout, each of the feedback control switches 450A, 450B is open and the sample control switches 460A and 460B are open and closed, respectively. The selected detection cell 160 then outputs and stores its respective reset signal VRST (see step S606) to the column line capacitor 410A; and, simultaneously, the selected pixel cell 150 outputs and stores its respective reset signal VRST (see step S206) to the column line capacitor 410B. Consequently, a charge transfer happens from column line capacitor 410A to capacitor 440A, and from capacitor 410B to capacitor 440B. Thus, since the feedback capacitors 440A, 440B are storing transferred charges, the amplifier 420A of the selected detection cell 160 column line 165A outputs a signal of [VREF−VRST+VDC], which is in turn stored at a capacitor 430 connecting the output of that amplifier 420A to the input of the amplifier 420B of the pixel cell column line 165B. The column line capacitors 410A, 410B, connecting capacitor 430, and feedback capacitors 440A, 440B may all be set to the same size.

The output of the amplifier 420B of the pixel cell 150 column line 165B is [VREF−[VREF−VRST+VDC]]+[VREF−[VRST−VIG]], which equates to [VREF+VSIG−VDC]. Because the sample control switches 460A, 46B are respectively open and closed during the second phase of readout, the output [VREF+VSIG−VDC] of the amplifier 420B of the pixel cell 150 column line 165B is stored to the second phase capacitor 470B of the column line 165B. Therefore, the first and second phase capacitors 470A, 470B of the sample and hold circuit hold charges of V1=VREF and V2=[VREF+VSIG−VDC], respectively. The column bus 43 may then transmit these respective signals V1, V2 to the differential amplifier 46, which in turn may output a signal V1−V2=[−VSIG+VDC] to the ADC 47 to compute provide a corrected digital pixel value of [−VSIG+VDC] to the image processor 48.

Figure 6:
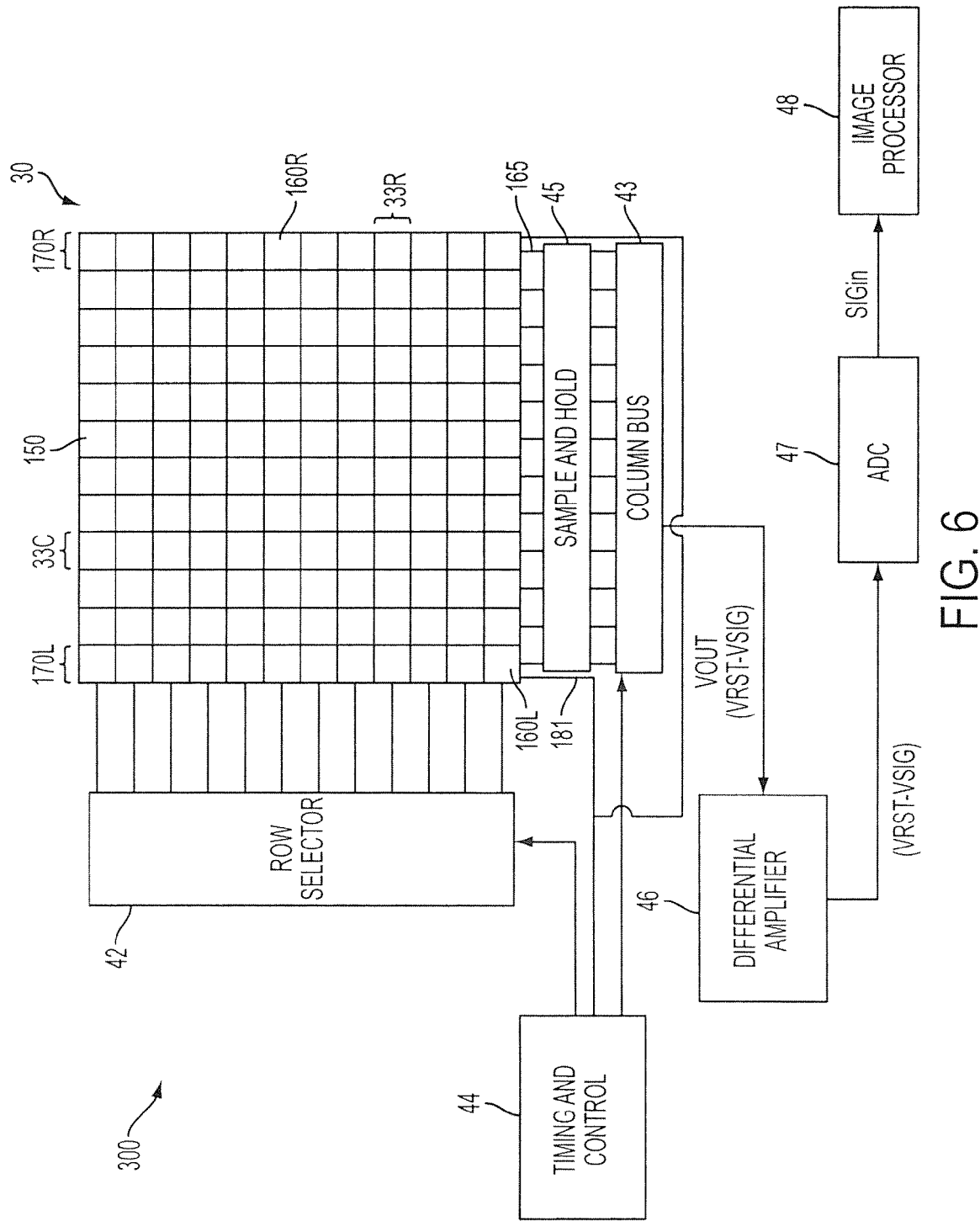
FIG. 6 is a block diagram illustrating another non-limiting example of an imaging device performing a dark current error correction.

FIG. 6 is a block diagram of an imaging device 700 having an imaging array 30 with a plurality of detection cells 160L, 160R per row 33R. Unlike the imaging device of FIG. 4A, the imaging device 700 of FIG. 6 provides left and right columns 170I, 170R of left and right detection cells 160L, 160R, respectively, such that each row 33R of the array 30 is provided an opposing pair of detection cells 160L, 160R. Respective dark charge signals VDC(L), VDC(R) of the left and right detection cells 160L, 160R are used to determine an average dark charge signal value VDC(AVG)=[VDC(L)+VDC(R)]/2 for each row 33R, which can be used to offset dark current error.

Figure 7:
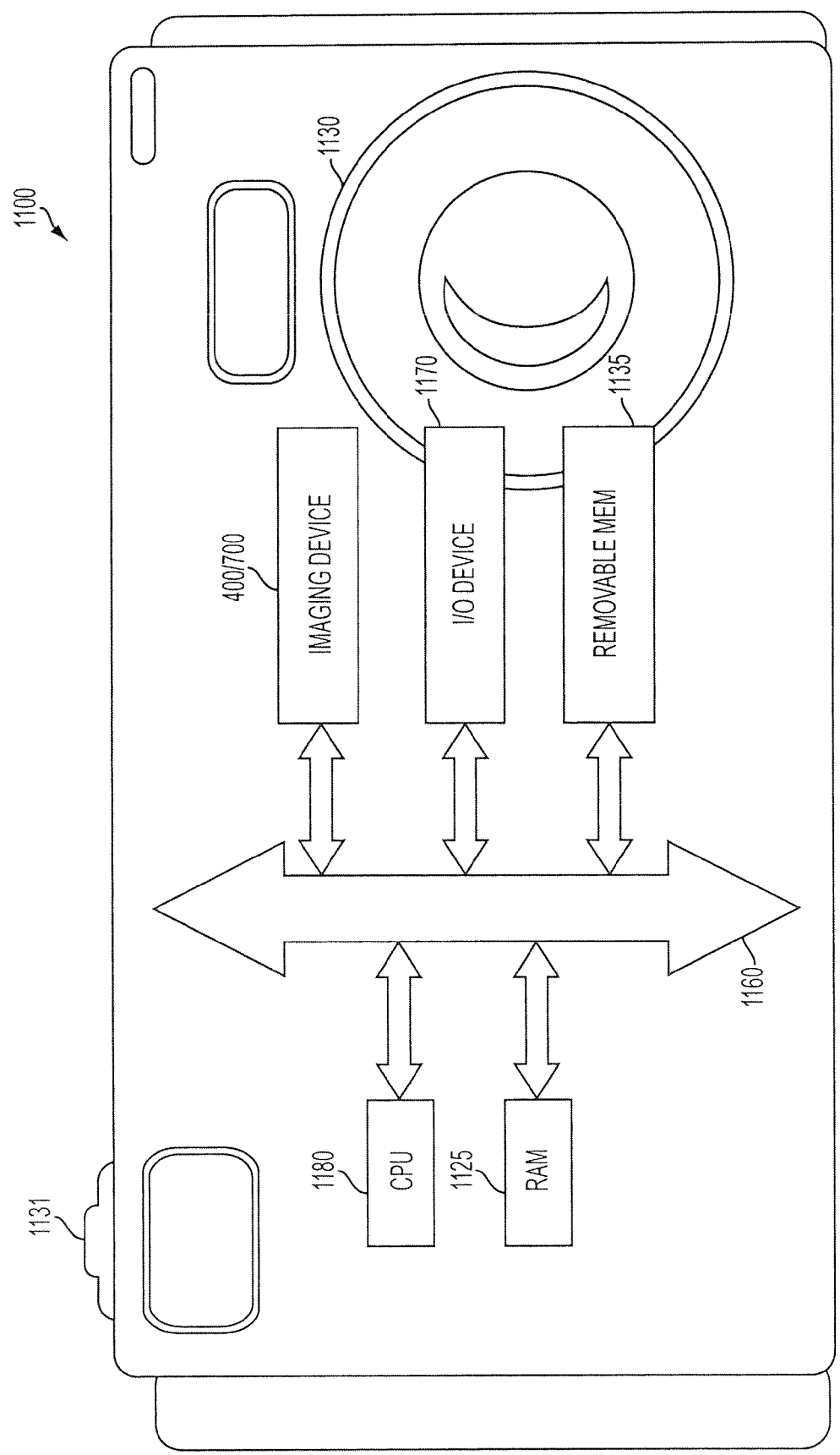
FIG. 7 is a block diagram illustrating a non-limiting example of a camera system, which may employ the imaging device of FIG. 4A.

FIG. 7 is a block diagram illustrating a non-limiting example of a processing system 1100 which may employ embodiments described herein. The system 1100 may be configured, for example, to include the imaging devices 400, 700 of FIGS. 4 and 6. The system 1100 may also include input/output (I/O) devices 1170, a CPU 1180 for controlling the processor system 1100, random access memory (RAM) 1125, removable memory 1135, and a bus 1160 for communication between the connected components. In this instance, the processor system 1100 is show as a still or video camera system including at least one lens 1130 for focusing an incoming image on an imaging array when a shutter release button 1131 is pressed.

It should be understood that that the invention is not limited to the specific embodiments and examples described and illustrated by this disclosure. Further, it should be understood that the protected scope of the invention is defined only by the scope of the appended claims.

What is claimed as new and desired to be protected by Letters Patent of the United States is:

1. An imaging device, comprising:
   an array of pixel cells, each pixel cell comprising a photosensor configured to receive light and generate a photocharge during an integration period; and
   a control system for differently operating a first set of said pixel cells and a second set of said pixel cells such that an output of a first pixel cell of said first set represents a dark current error and an output of a second pixel cell of said second set represents said dark current error and a detected light signal, wherein said each first pixel cell and said second pixel cell are configured to receive light from an image scene and wherein, during said integration period, a reset device removes charge from said photosensor of said first pixel cell and said photosensor of said second pixel cell accumulates said photocharge.

2. The imaging device of claim 1, wherein said imaging device uses said output of said first pixel cell to offset said dark current error in said output of said second pixel cell.

3. The imaging device of claim 1, wherein said output of said first pixel cell indicates a total amount of charge in an associated charge storage region thereof, said output of said second pixel cell indicates a total amount of charge in an associated charge storage region thereof, and a magnitude of said output of said first pixel cell is substantially equal to said dark current error in said output of said second pixel cell.

4. The imaging device of claim 1, wherein said pixel cells each comprise a charge storage region, wherein a total amount of charge in said charge storage region of said first pixel cell is substantially equal to a total amount of charge in said charge storage region of said second pixel cell minus photocharge in said charge storage region of said second pixel cell.

5. The imaging device of claim 1, wherein said pixel cells each comprise a charge storage region, wherein said charge storage regions of said pixel cells each comprise a doped region of a substrate, and a total amount of charge in said charge storage region of said first pixel cell is substantially equal to a sum of an amount of charge leaked into said charge storage region of said second pixel cell and an amount of charge photogenerated by a photosensor of said second pixel.

6. The imaging device of claim 1, wherein said first and second pixel cells each have a charge storage region, wherein said charge storage regions each comprise a doped region of a substrate, and said doped region of said first pixel cell and said doped region of said second pixel cell are configured to receive light from the image scene.

7. The imaging device of claim 1, wherein, during capture of an image, said imaging device is configured to selectively operate said set of first pixel cells and said set of second pixel cells such that said output of said each first pixel cell indicates said error in said output of said at least one corresponding second pixel cell, and wherein, during capture of another image frame, said imaging device is configured to selectively operate said set of first pixel cells and said set of second pixel cells in the same manner.

8. The imaging device of claim 1, further comprising:
a system of readout devices that include the reset device, wherein, during said integration period, said system of readout devices selectively prevents said photosensor of said first pixel cell from accumulating charge while said photosensor of said second pixel cell accumulates photocharge.

9. The imaging device of claim 1, wherein said photosensors each have a charge storage region, further comprising:
a system of readout devices that include the reset device, wherein, during capture and pixel cell readout of an image, said system of readout devices selectively prevents said photosensor of said first pixel cell from transferring photocharge to said associated charge storage region thereof.

10. The imaging device of claim 1, wherein said photosensors each have a charge storage region, further comprising:
a system of readout devices for resetting said photosensors and said charge storage regions, for transferring said photocharge to said floating diffusion regions, and for producing said outputs of said first pixel cell and said second pixel cell based on respective amounts of charge in said charge storage regions thereof, wherein said control system controls said system of readout devices so as to prevent said amount of charge in said charge storage region of said first pixel cell from receiving photocharge generated by said photosensor of said first pixel cell, wherein the system of readout devices include the reset device.

11. The imaging device of claim 1, wherein each row of said pixel cell array comprises a portion of said pixel cells of said second set, said image is represented by a collection of said outputs of said pixel cells of said second set, and said photocharge is simultaneously transferred from said photosensors of said pixel cells of said second set to associated charge storage regions thereof.

12. The imaging device of claim 11, wherein an amount of said dark current error in said output of said second pixel cell corresponds to a length of time between said simultaneous charge transfer and reading out of said output of said second pixel cell.

13. The imaging device of claim 12, wherein an amount of charge in said charge storage region of said first pixel cell does not include photocharge and corresponds to said length of time between said simultaneous charge transfer and reading out of said output of said second pixel cell.

14. The imaging device of claim 13, wherein a given row of said pixel cell array comprises said first pixel cell and said second pixel cell, and said outputs of said pixel cells of said first set and said outputs of said pixel cells of said second set are read out row-by-row.

15. The imaging device of claim 13, wherein said charge storage regions each comprise a doped region of a substrate, and said output of said first pixel cell and said output of said second pixel cell are read out at substantially the same time such that an amount of charge leaked into said doped region of said first pixel cell is substantially equal and an amount of charge leaked into said doped region of said second pixel cell.

16. An imaging device comprising:
a pixel array comprising a plurality of pixels, each including a photosensor for generating charges in response to receiving incidental light during an integration period;
a first set of said plurality of pixels, each first set pixel accumulating photosensor generated charges and providing an image output signal representing component accumulated photosensor generated charges and dark current charges accumulated into the first said pixel charges; and
a second set of said plurality of pixels each second set pixel providing an output signal representing dark current charges accumulated within the second set pixel, wherein said each first set pixel and said second pixel are configured to receive light from an image scene and wherein, during an integration period, a reset device removes charge from said photosensor of said second pixel and said photosensor of said first pixel cell accumulates said photosensor generated charges.

* * * * *